United States Patent
Mandal

(10) Patent No.: US 6,694,444 B1
(45) Date of Patent: Feb. 17, 2004

(54) SYSTEM AND METHOD FOR REDUCING OVER-SHOOT AND RINGBACK BY DELAYING INPUT AND ESTABLISHING A SYNCHRONIZED PULSE OVER WHICH CLAMPING IS APPLIED

(75) Inventor: Subrata Mandal, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 614 days.

(21) Appl. No.: 09/608,719

(22) Filed: Jun. 30, 2000

(51) Int. Cl.⁷ ............................................... G06F 1/30
(52) U.S. Cl. ................. 713/400; 713/401; 713/500; 713/501; 713/502; 713/503; 327/309; 327/321; 327/322
(58) Field of Search .................. 713/400–401, 713/500–503; 327/309–333

(56) References Cited

U.S. PATENT DOCUMENTS

| | | | | |
|---|---|---|---|---|
| 5,500,817 A | * | 3/1996 | McLaury ............... 365/189.05 |
| 5,568,062 A | * | 10/1996 | Kaplinsky ................... 326/27 |
| 5,842,155 A | * | 11/1998 | Bryson et al. ............. 702/124 |
| 5,949,825 A | * | 9/1999 | Naffziger ................... 375/257 |
| 6,091,265 A | * | 7/2000 | Singh ........................... 326/83 |
| 6,111,449 A | * | 8/2000 | Tobita ........................ 327/327 |
| 6,229,372 B1 | * | 5/2001 | Mashak et al. ............. 327/318 |
| 6,262,607 B1 | * | 7/2001 | Suzuki ....................... 327/112 |
| 6,400,546 B1 | * | 6/2002 | Drapkin et al. ............. 361/111 |

FOREIGN PATENT DOCUMENTS

JP             05243940 A    *    9/1993    ......... H03K/17/16

OTHER PUBLICATIONS

IBM TDB, vol. 24, issue 4, p. #2199–2200, Title:"Dynamic Differential Sense Amplifier Register"Dtd. Sep. 1, 1981.*

* cited by examiner

Primary Examiner—Thomas Lee
Assistant Examiner—Nitin C. Patel
(74) Attorney, Agent, or Firm—Blakely, Sokoloff, Taylor & Zafman LLP

(57) ABSTRACT

In one embodiment of the invention, a clamping circuit clamps an input signal to reduce overshoot and ringback. A pulse generator generates a pulse signal having a pulse interval from the input signal and a delayed signal. The input signal transitions from a first level to a second level. The delayed signal is derived from the input signal. A controller generates a control signal responsive to the pulse signal. A switching circuit clamps one of the overshoot and the ringback of the input signal within the pulse interval upon receipt of the control signal.

30 Claims, 9 Drawing Sheets

SYSTEM AND METHOD FOR REDUCING OVER-SHOOT AND RINGBACK BY DELAYING INPUT AND ESTABLISHING A SYNCHRONIZED PULSE OVER WHICH CLAMPING IS APPLIED

BACKGROUND

1. Field of the Invention

This invention relates to semiconductor devices. In particular, the invention relates to buffer circuits.

2. Description of Related Art

Signal integrity is a key issue for front side bus input/output (I/O) buffer design. As processor clock rates become higher and higher, semiconductor process is faster and faster causing many signal integrity problems. In a system where a processor receives signal on the bus, the signal may be subject to high overshoot and ringback. For example, a processor operating at a supply voltage Vcc of 1.5V may experience a signal overshoot of 2.1V and a ringback up to 0.95V. Such a high signal overshoot may lead to gradual oxide degradation impacting silicon life time.n A large ringback may create a push-out in the signal flight time.

Existing techniques to solve ringbacks and overshoots at the receiver have a number of drawbacks. One approach is to use self-timed circuits to generate an appropriate clamping pulse. Another approach is to use separate receiver and driver clamping circuits. These approaches require considerable amount of silicon area. In addition, these approaches may not work with signals running at high clock rates.

Therefore, there is a need to have an efficient technique that can reduce signal overshoot and ringback.

BRIEF DESCRIPTION OF THE DRAWINGS

The features and advantages of the present invention will become apparent from the following detailed description of the present invention in which.

DESCRIPTION

Figure 1:
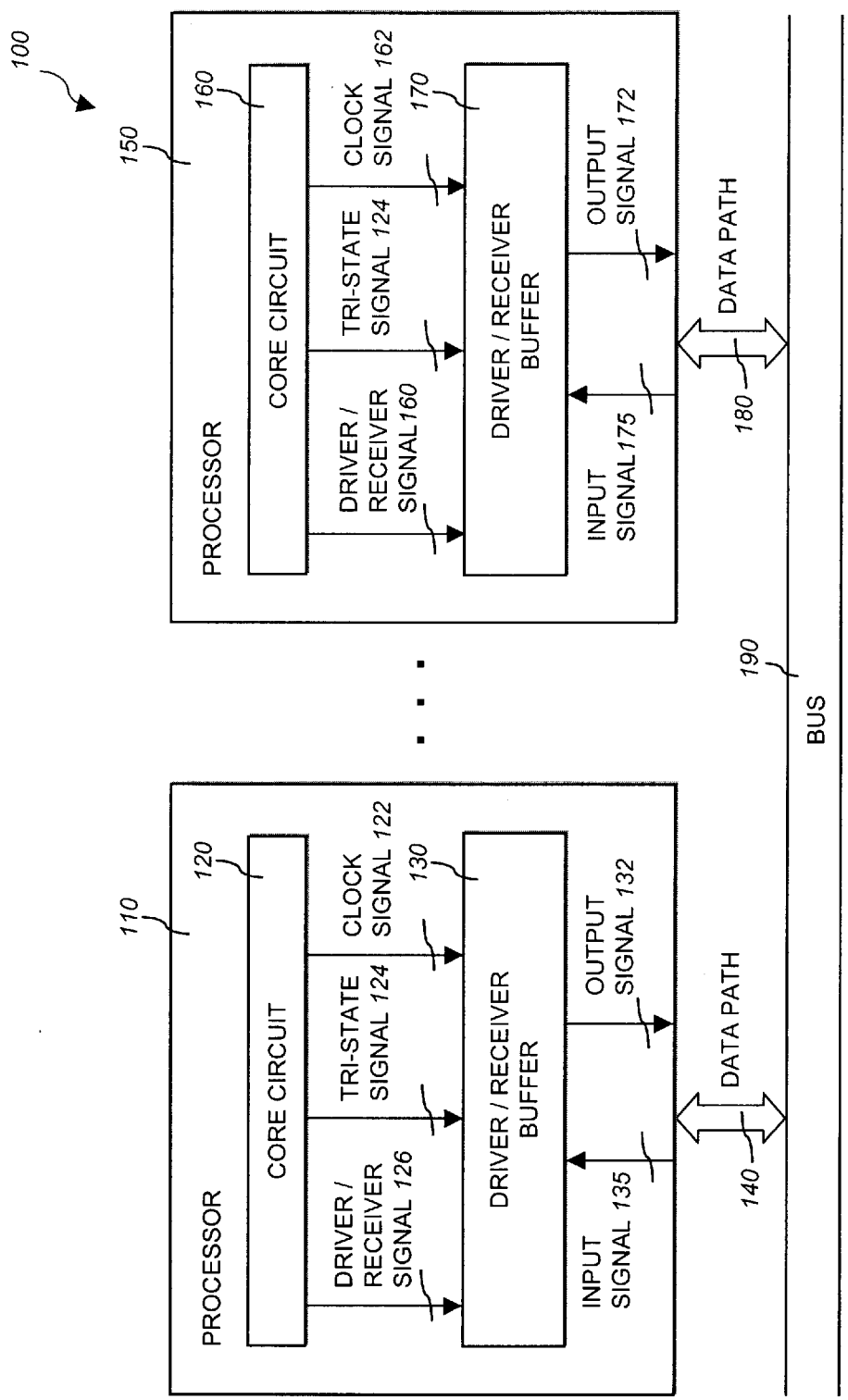
FIG. 1 is a diagram illustrating a system in which one embodiment of the invention can be practiced.

The present invention is a technique to reduce signal overshoot and ringback of an input signal at a receiver buffer using a clamping circuit.

The clamping is accomplished by using a pull-up transistor connected between the input signal and the supply source (Vcc). Such a pull-up transistor may already have been used for a driver function. The use of the same pull-up transistor for both driver and receiver results in significant saving in silicon area. The pull-up transistor is turned on by a clamp signal on the low to high transition of the received signal. This pull-up transistor remains on during a pulse interval. In one embodiment, this pulse interval is approximately between 3.1 nanoseconds (nsec) to 6.0 nsec. Since the pull-up transistor is connected to the supply source, any ringback or overshoot is reduced through the discharge and charging of the pull-up transistor.

The clamp control circuit is optimized to have a low trip point at a predefined threshold (e.g., 0.8V). The maximum delay between the received input signal crossing this predefined threshold and the triggering of the clamp signal is very fast (e.g., 150 picoseconds) across different process skew. Once turned on, the clamp signal remains ON during the pulse interval. The pulse interval is selected to cover the ringback and the overshoot active time period.

The input signal transitions from a first level to a second level at the buffer. The clamping circuit includes a pulse generator, a controller, and a switching circuit. The pulse generator generates a pulse signal having a pulse interval from the input signal and a delayed signal. The delayed signal is derived from the input signal. A controller generates a control signal responsive to the pulse signal. A switching circuit clamps one of the overshoot and the ringback of the input signal within the pulse interval upon receipt of the control signal.

In one embodiment of the invention, the clamping circuit further includes a sensing circuit and a synchronizer. The sensing circuit generates a sense signal from the input signal. The synchronizer generates the delayed signal from the sense signal using a clock signal. The delayed signal is delayed from the input signal by approximately the pulse interval. The sensing circuit includes a sensing amplifier and an inverter. The sensing amplifier senses the input signal transitioning from the first to the second levels. The inverter inverts the sensed input signal to generate the sense signal. The synchronizer includes a frequency scaler, at least a synchronizing element (e.g., a flip-flop), and an inverter. The frequency scaler scales the clock signal to a lower frequency. The synchronizing element generates a synchronized signal from the sense signal at the pulse interval using the scaled clock signal. The inverter inverts the synchronized signal. The inverted synchronized signal corresponds to the delayed signal.

The pulse generator includes a logic combiner (e.g., AND, OR gates) to combine the input signal and the delayed signal to provide the pulse signal. When there is a tri-state signal which controls the tri-state of the buffer, the pulse generator includes a logic combiner to combine the input signal, the delayed signal, and the tri-state signal to provide the pulse signal.

The controller includes a logic combiner (e.g., AND/OR gates) to combine the pulse signal and a tri-state signal to provide the control signal. When there is a driver/receiver signal which controls direction of the buffer, the logic combiner combines the pulse signal, the tri-state signal, and the driver/receiver signal to provide the control signal.

The switching circuit includes two switching elements, a logic combiner, and a pull-up transistor. The two switching elements (e.g., transistors) generate a clamp signal responsive to the control signal and a gating signal. The logic combiner combines the tri-state signal, the input signal, and the delayed signal to generate the gating signal. The pull-up transistor clamps the input signal upon receipt of the clamp signal.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

FIG. 1 is a diagram illustrating a system 100 in which one embodiment of the invention can be practiced. The system 100 includes processors 110 and 150, and a bus 190. For illustrative purposes, only two processors I 10 and 150 are shown.

The processors 110 and 150 may be any processor that can drive or receive signals on the bus 190. Examples of the processors 110 and 150 include microprocessors, chipsets, microcontrollers, media processors, input/output processors, etc. In this illustrative example, one processor drives a signal to the bus 190 while the other processor receives the signal from the bus 190. Also, to simplify the description, the two processors 110 and 150 are the same. One skilled in the art should readily recognize that the driving processor and the receiving processor may be different. The processors 110 and 150 interface to the bus 190 via data paths 140 and 180, respectively.

The processor 110 includes a core circuit 120 and a bus driver/receiver buffer 130. The core circuit 120 includes circuitry to generate control signals to the bus driver/receiver buffer 130. Examples of these control signals include a clock signal 122, a tri-state signal 124, and a driver/receiver signal 126. The clock signal 122 is the core clock signal to provide timing reference. In one embodiment, the frequency of the clock signal is several hundred mega hertz (MHz), e.g., 700 MHz. The tri-state signal 124 controls the tri-state, or high impedance, of the buffer 130. When the tri-state signal 124 is asserted, the buffer 130 is in high impedance state. When the tri-state signal 124 is de-asserted, the buffer 130 is in one of the two logic levels, HIGH and LOW. In the following description, the active level of the tri-state signal 124 is HIGH, i.e., when the tri-state signal 124 is HIGH, the buffer 130 is in high impedance state. It is readily recognized that the active level of the tri-state signal 124 may be LOW and the corresponding logic circuit is modified accordingly. The driver/receiver signal 126 controls the direction of the buffer 130, setting it either in an input (i.e., receiving), or an output (i.e., driving) state. When the driver/receiver signal 126 is asserted, the buffer 130 acts as a receiving buffer, receiving a signal from the bus. When the driver/receiver signal 126 is de-asserted, the buffer 130 acts as a driving buffer, sending a signal onto the bus. In the following description, the active level of the driver/receiver signal 126 is LOW, i.e., when the driver/receiver signal 126 is LOW, the buffer 130 receives signal from the bus. It is readily recognized that the active level of the driver/receiver signal 126 may be HIGH and the corresponding logic circuit is modified accordingly.

The bus driver/receiver buffer 130 includes circuit to drive a signal onto the bus 190 or receive signal from the bus 190. When the buffer 130 is a driver, it drives an output signal 132 onto the bus 190. When the buffer 130 is a receiver, it receives an input signal 135 from the bus 190.

The processor 150 has similar elements as the processor 110. The processor 150 includes a core circuit 160 and a bus driver/receiver buffer 170. The core circuit 160 provides a clock signal 162, a tri-state signal 164, and a driver/receiver signal 166 to the buffer 170. The buffer 170 drives an output signal 172 onto the bus 190 and receives an input signal 175 from the bus.

Each of the processors 110 and 150 may send or receive signals to/from the bus 190. For example, the processor 110 drives the output signal 132 onto the bus 190 via the data path 140. The output signal 132 propagates on the bus 190 to the processor 150. The processor 150 receives the output signal 132 via the data path 180. The output signal 132 then becomes the input signal 175 to be received by the bus driver/receiver 170.

In the following discussion, for clarity, the processor 110 is the receiver while the processor 150 is the driver. Of course, when the role is switched, all the descriptions about the buffer 130 in the processor 110 can be applicable for the buffer 170 in the processor 150.

Figure 2:
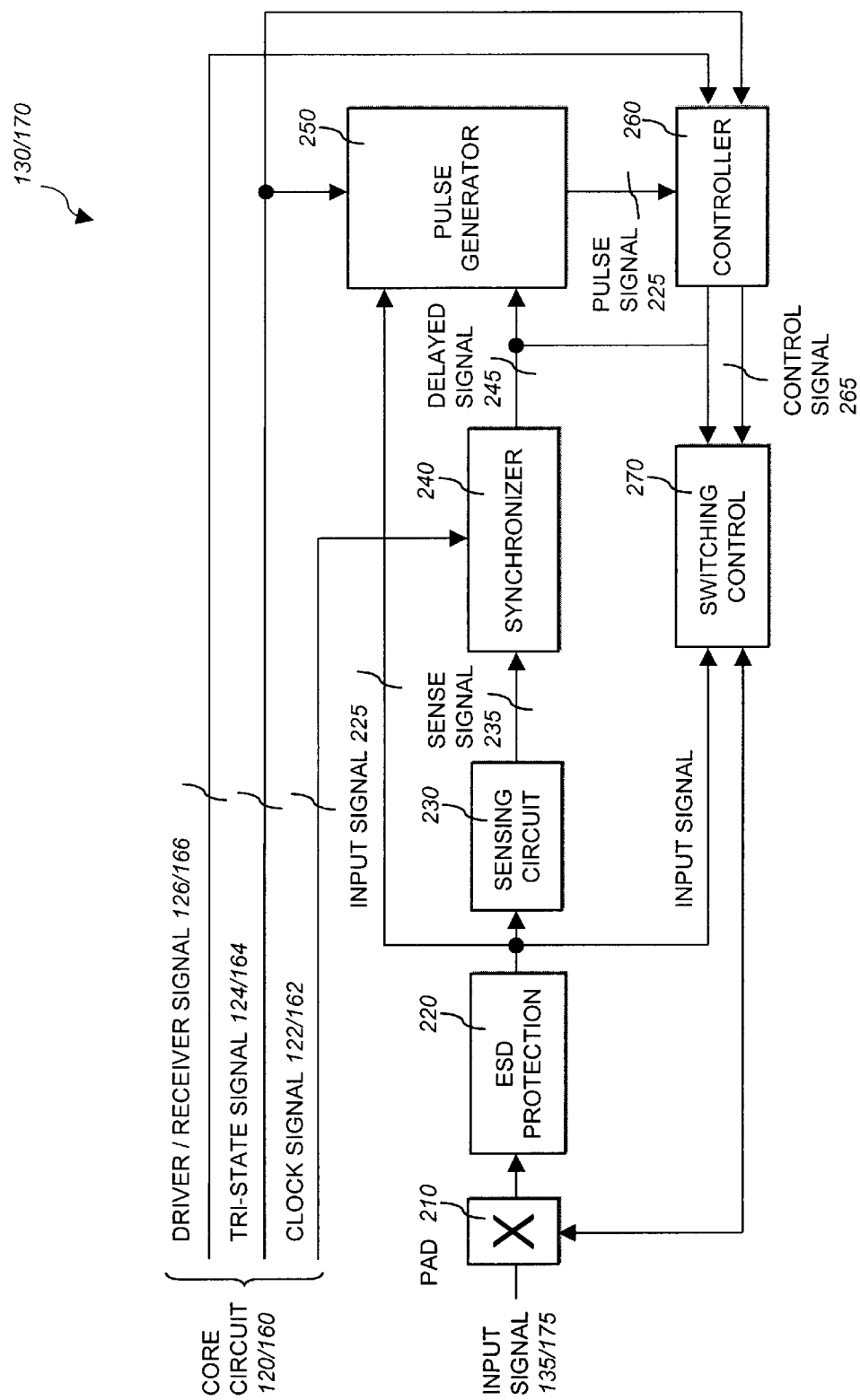
FIG. 2 is a diagram illustrating a driver/receiver buffer according to one embodiment of the invention.

FIG. 2 is a diagram illustrating the driver/receiver buffer 130 or 170 shown in FIG. 1 according to one embodiment of the invention. The buffer 130 includes a pad 210, an electrostatic discharge (ESD) protection circuit 220, a sensing circuit 230, a synchronizer 240, a pulse generator 250, a controller 260, and a switching circuit 270.

The pad 210 is a contact terminal that connects to receive the bus input signal 135 coming from the bus via the data path 140 (FIG. 1). The ESD protection circuit 220 provides normal ESD protection to the bus input signal 135. The ESD protection circuit 220 conditions on the bus input signal 135 to generate an internal input signal 225.

The sensing circuit 230 receives the input signal 225 and generates a sense signal 235. The sensing circuit 230 provides a trip point, or a threshold level, to sense the input signal 235. This will enhance or define the input signal more clearly for subsequent processing.

The synchronizer 240 synchronizes the sense signal 235 using the clock signal 122 and generates a delayed signal 245. The synchronizer 240 essentially delays the sense signal 235 by an amount that can be accurately controlled with the clock signal 122. This delay amount corresponds to a pulse interval over which the overshoot and ringback of the input signal 225 is attenuated or reduced.

The pulse generator 250 receives the input signal 225 and the delayed signal 245 to generate a pulse signal 255. The pulse signal 255 establishes a window or pulse interval for the clamping action to take place, reducing the overshoot and ringback. The pulse generator 250 also gates the tri-state signal 124 such that if the tri-state signal 124 is asserted, it will override the receiver function.

The controller 260 receives the pulse signal 255 and generates a control signal 265 to control the switching circuit 270. The controller 260 also receives the tri-state signal 124 and the driver/receiver signal 126 so that if any one of these signals is asserted, it will override the receiver function.

The switching circuit 270 is connected to the pad 210 to provide the clamping action on the bus input signal 135 upon receipt of the control signal 265. The switching circuit 270 receives the internal input signal 225 and the delayed signal 245 to provide a switching action complementary to another switching action due to the control signal 265 as will be explained later.

Figure 3:
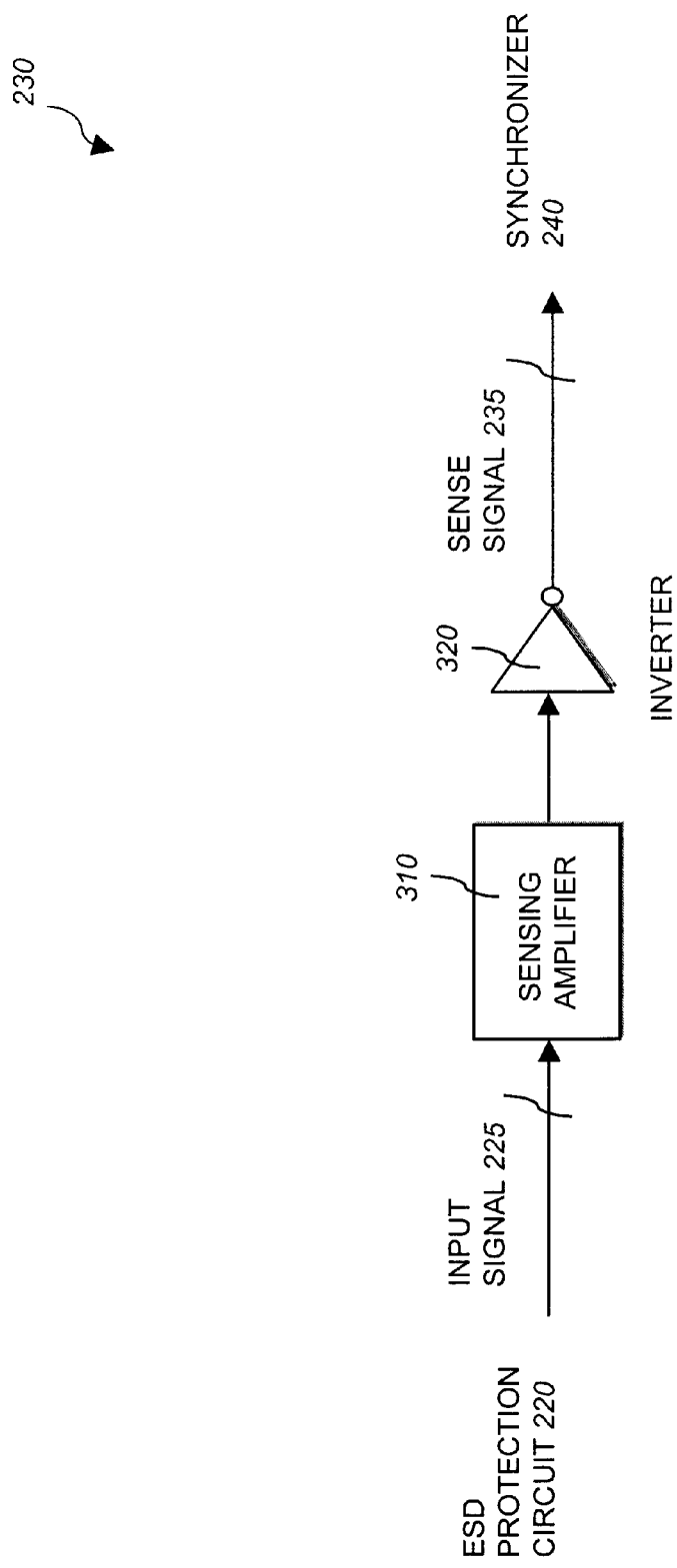
FIG. 3 is a diagram illustrating a sensing circuit shown in FIG. 2 according to one embodiment of the invention.

FIG. 3 is a diagram illustrating the sensing circuit 230 shown in FIG. 2 according to one embodiment of the invention. The sensing circuit 230 includes a sensing amplifier 310 and an inverter 320.

The sensing amplifier 310 senses the input signal 225 (FIG. 2) and generates a signal with well-defined logic level. The sensing amplifier 310 essentially has a predetermined threshold. When the input signal 225 exceeds this threshold, the sensing amplifier 310 generates a signal at one logic level, e.g., HIGH. When the input signal 225 is below this threshold level, the sensing amplifier 310 generates a signal at another logic level, e.g., LOW. In one embodiment, this threshold is set at 0.8 V so that when the input signal 225 transitions from a low level to a high level, the clamping action is triggered when the input signal crosses the 0.8 V threshold. The inverter 320 inverts or complements the output of the sensing amplifier to generate the sense signal 235. The inverter 320 may not be needed if the logic circuit in subsequent stages is modified.

Figure 4:
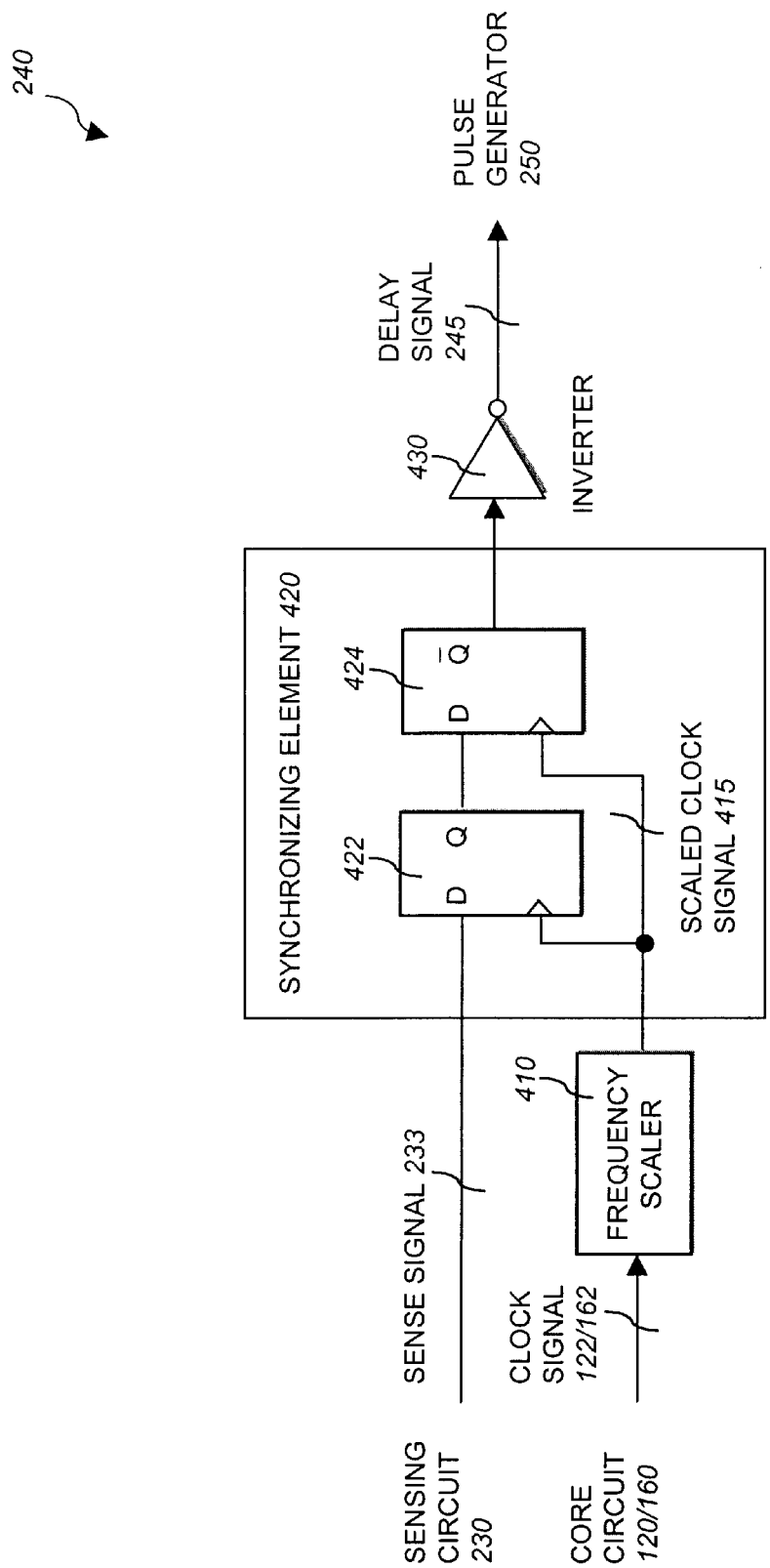
FIG. 4 is a diagram illustrating a synchronizer shown in FIG. 2 according to one embodiment of the invention.

FIG. 4 is a diagram illustrating the synchronizer 240 shown in FIG. 2 according to one embodiment of the invention. The synchronizer 240 includes a frequency scaler 410, a synchronizing element 420, and an inverter 430.

The frequency scaler 410 receives the clock signal 122 from the core circuit 120 (FIG. 1) and generates a scaled clock signal 415. The frequency scaler 410 essentially is a frequency divider and scales the frequency of the clock signal 122 to some predefined frequency. In one embodiment, the frequency of the clock signal 122 is 700 MHz and the frequency scaler 410 divides the frequency by two to generate a 350-MHz scaled clock signal. The scaled clock signal 415 then has a period of 2.85 nsec.

The synchronizing element 420 synchronizes the sense signal 235 from the sensing circuit (FIG. 3) using the scaled clock signal 415. The synchronizing element 420 essentially delays the sense signal 235 by a delay amount that can be accurately controlled by the scaled clock signal 415. In one embodiment, the synchronizing element 420 includes two flip-flops connected in cascade so that the delay amount can range from one period to two periods of the scaled clock signal 415. For a 350-MHz clock frequency, this is equivalent to approximately 2.85 nsec to 5.7 nsec. This delay amount establishes the pulse interval over which the clamping action takes place.

The inverter 430 inverts the logic level for the logic operation in subsequent processing stage. The inverter 430 may not be necessary and can be included in logic combining operations in subsequent stage. The inverter 430 generates the delayed signal 245 to go to the pulse generator 250 (FIG. 2).

Figure 5:
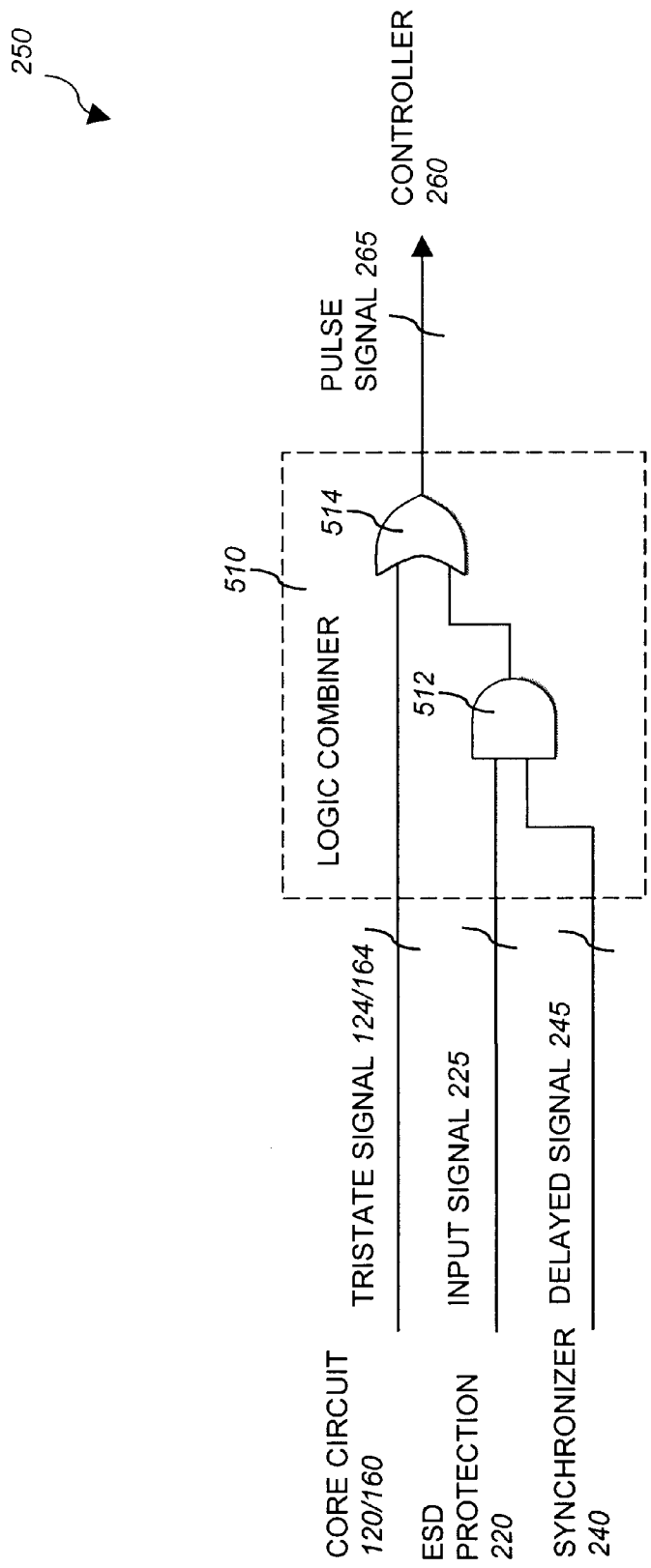
FIG. 5 is a diagram illustrating a pulse generator shown in FIG. 2 according to one embodiment of the invention.

FIG. 5 is a diagram illustrating the pulse generator 250 shown in FIG. 2 according to one embodiment of the invention. The pulse generator 250 includes a logic combiner 510.

The logic combiner 510 combines the delayed signal 245, the input signal 225, and the tri-state signal 124 to generate the pulse signal 265. The logic combiner 510 includes an AND gate 512 and an OR gate 514. The AND gate 512 performs an ANDing operation on the delayed signal 245 and the input signal 225. Since the delayed signal 245 is an inverted and delayed version of the input signal 225, ANDing the delayed signal 245 and the input signal 225 essentially generates a pulse signal with a pulse width approximately equal to the delay amount. The OR gate 514 gates the tri-state signal 124 through to override the receiver function and sets the buffer in the high impedance state when the tri-state signal 124 is asserted. When tri-state control is not needed, the OR gate 514 can be eliminated and the output of the AND gate 512 becomes the pulse signal 265.

Figure 6:
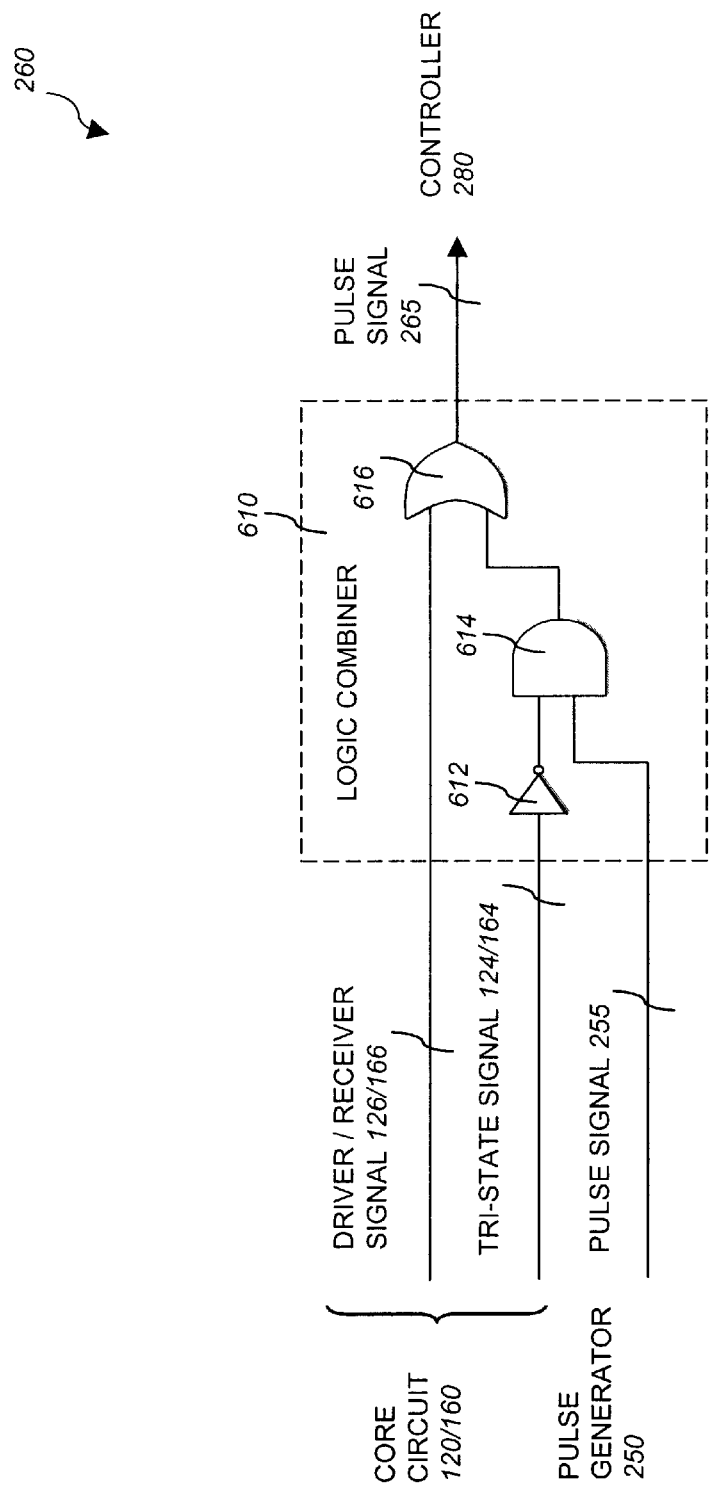
FIG. 6 is a diagram illustrating a controller shown in FIG. 2 according to one embodiment of the invention.

FIG. 6 is a diagram illustrating the controller 260 shown in FIG. 2 according to one embodiment of the invention. The controller 260 includes a logic combiner 610.

The logic combiner 610 combines the pulse signal 255 from the pulse generator 250 (FIG. 2), the tri-state signal 124 and the driver/receiver signal 126 from the core circuit 120 (FIG. 1) to generate the control signal 265. The logic combiner 610 essentially gates the clamping function with the tri-state control and the driver/receiver functions. The logic combiner 610 includes an inverter 612, an AND gate 614, and an OR gate 616. The inverter 612 and the AND gate 614 allows the pulse signal 255 to pass through when tri-state control is inactive, i.e., when the tri-state signal 124 is de-asserted LOW. The OR gate 616 allows the pulse signal 255 to pass through when the buffer is set for receiver function, i.e., when the driver/receiver signal 126 is asserted LOW. In other words, during normal operation when there is no tri-state control and the buffer is in the receiver mode, the control signal 265 is essentially the same as the pulse signal 255 with some delay.

Figure 7:
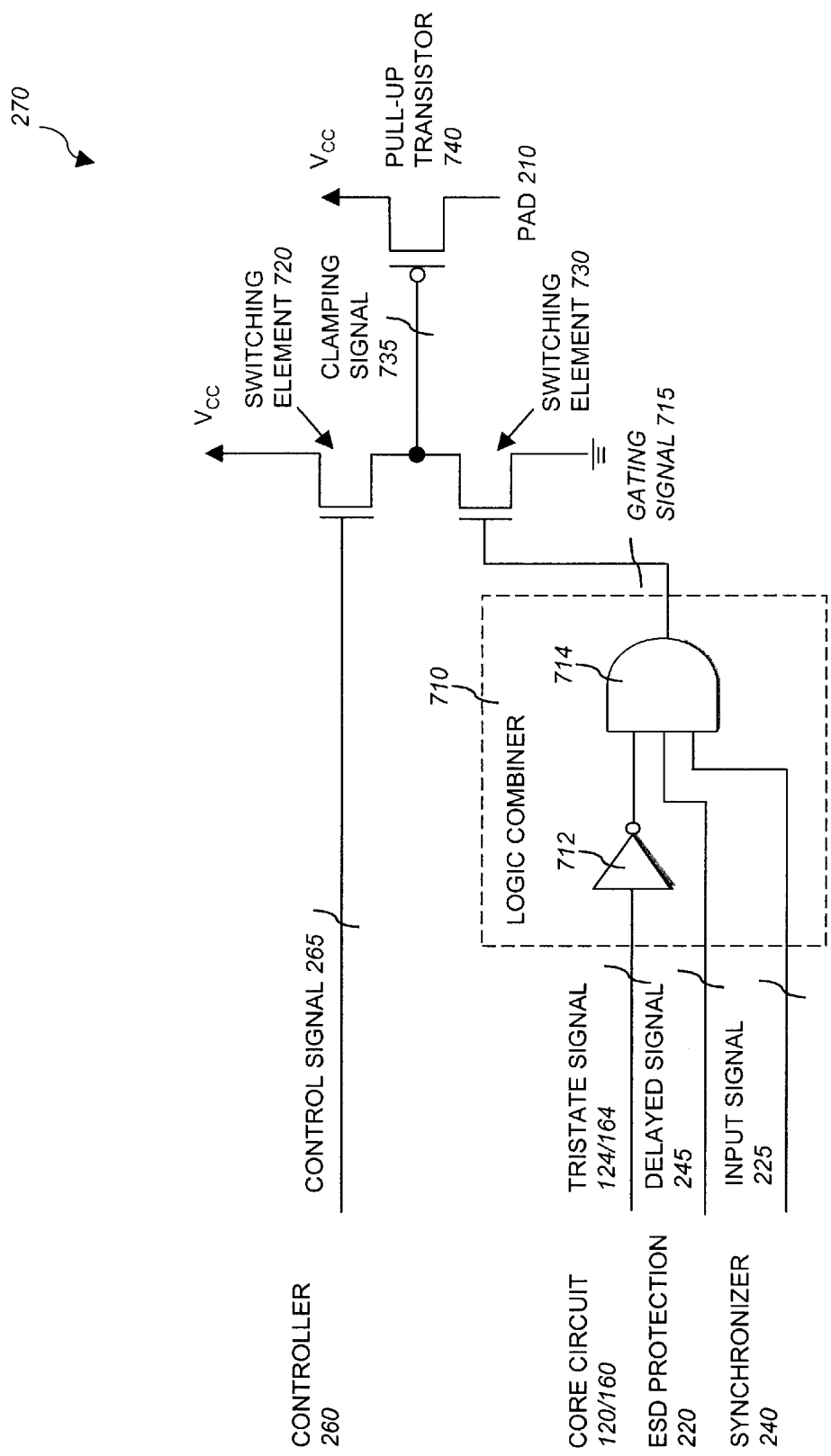
FIG. 7 is a diagram illustrating a switching circuit shown in FIG. 2 according to one embodiment of the invention.

FIG. 7 is a diagram illustrating the switching circuit 270 shown in FIG. 2 according to one embodiment of the invention. The switching circuit 270 includes a logic combiner 710, two switching elements 720 and 730, and a pull-up transistor 740.

The logic combiner 710 receives the tri-state signal 124, the delayed signal 245, and the input signal 225 to generate a gating signal 715. The switching element 720 and 730 help to charge up and discharge the gate of the pull-up transistor 740. In one embodiment, the switching elements 720 and 730 are two transistors with complementary controls. The switching element 720 is turned ON and OFF when the control signal 265 is LOW and HIGH, respectively. The switching element 730 is turned ON and OFF when the gating signal is HIGH and LOW, respectively. The two switching elements 720 and 730 are connected together to generate a clamping signal 735 which is used to control the pull-up transistor 740.

The pull-up transistor 740 is controlled by the clamping signal 735 at the gate terminal. The source and drain terminals of the pull-up transistor 740 are connected to the supply source and the pad 210, respectively. As discussed above, the pad 210 is connected to the bus input signal 135 (FIG. 2). When the control signal 265 and the gating signal 715 are the same, the two switching elements 720 and 730 are in complementary states, i.e., if one is OFF the other is ON. When the control signal 265 and the gating signal 715 are both HIGH, as in the pulse interval, the clamping signal 735 is pulled down LOW, turning ON the pull-up transistor 740. During this clamping period, any ringback of the input signal 135 is attenuated or reduced by charging the pull-up transistor 740 to the supply source. Similarly, any overshoot on the input signal 135 above the supply source is discharged through the pull-up transistor 740, resulting in a reduction of the overshoot. In one embodiment, the supply source Vcc is at 1.5 Volts. This supply level results in approximately 250 mV ringback and 200 mV overshoot improvements.

Figure 8:
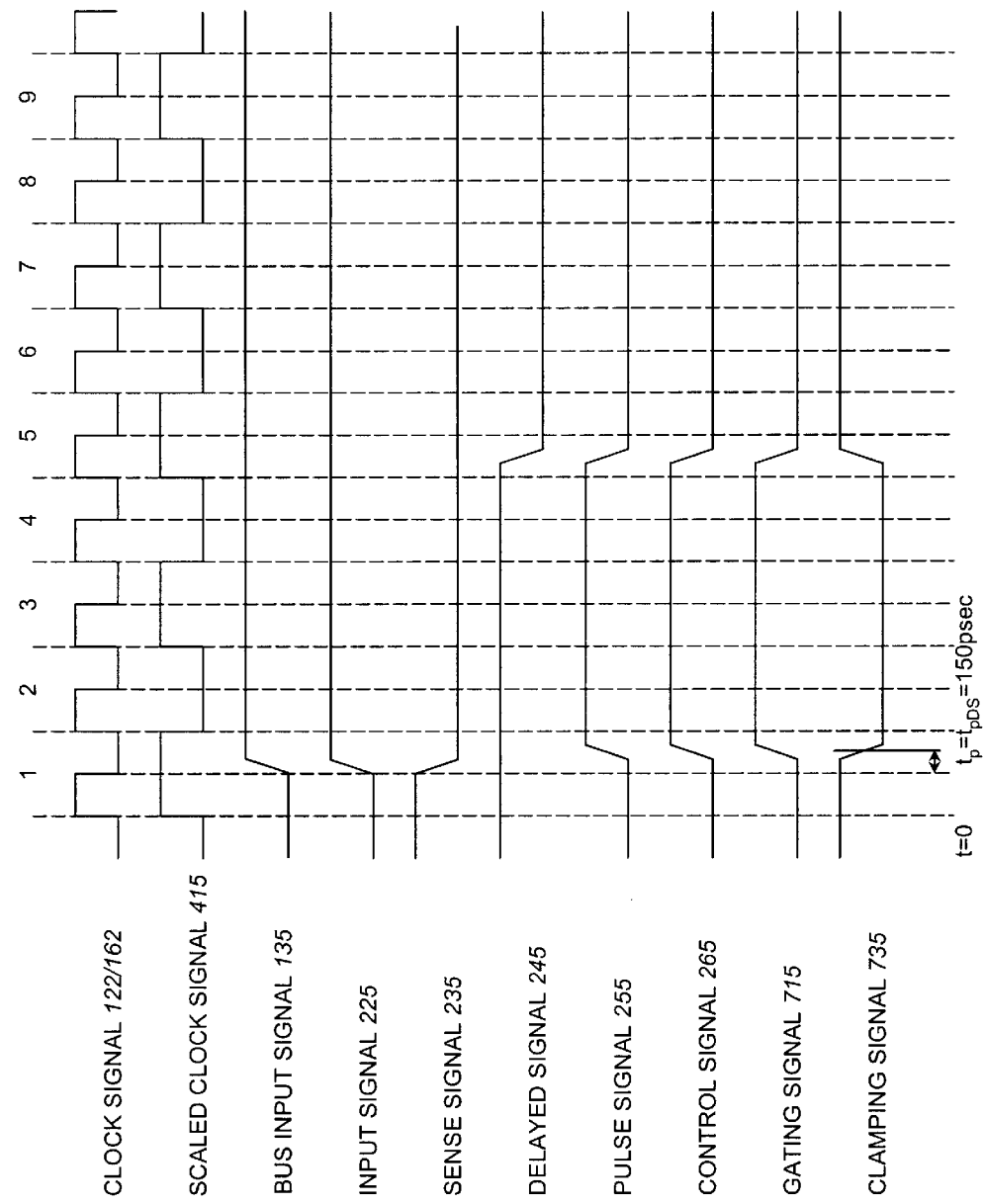
FIG. 8 is a timing diagram illustrating various signals in the clamp circuit according to one embodiment of the invention.

FIG. 8 is a timing diagram illustrating various signals in the clamp circuit according to one embodiment of the invention. The timing diagram shows the waveforms of the clock signal 122, the scaled clock signal 415, the bus input signal 135, the internal input signal 225, the sense signal 235, the delayed signal 245, the pulse signal 255, the control signal 265, the gating signal 715, and the clamping signal 735. In this illustrative example, the tri-state signal is de-asserted LOW and the driver/receiver signal is at the receiver state LOW.

The internal input signal 225 is the same as the bus input signal 135 with some delay. The scaled clock signal 415 is a divide-by-2 from the clock signal 122. The input signal 225 transitions from a low level to a high level. The sense signal 235 is an inverted version of the input signal 225. The delayed signal 245 is delayed by two clock periods with respect to the positive going edge of the scaled clock signal 415 at time t=0. The pulse signal 255 is the result of ANDing the input signal 225 and the delayed signal 245. The pulse signal 255 has pulse interval between one clock period to two clock periods of the scaled clock signal 415.

Since the tri-state signal is de-asserted LOW and the driver/receiver signal is asserted LOW, the control signal 265 and the gating signal 715 are the same as the pulse signal 255 with some delay. The clamping signal 735 is an inverted version of the pulse signal 255. The low pulse of the clamping signal 735 defines the clamping action. The total delay between the low-to-high transition of the bus input signal 135 and the high-to-low transition of the clamping signal 736 is approximately 150 picoseconds due to various delays caused by the process skew. This delay is very fast resulting in a very fast turn-on for the clamping action.

Figure 9:
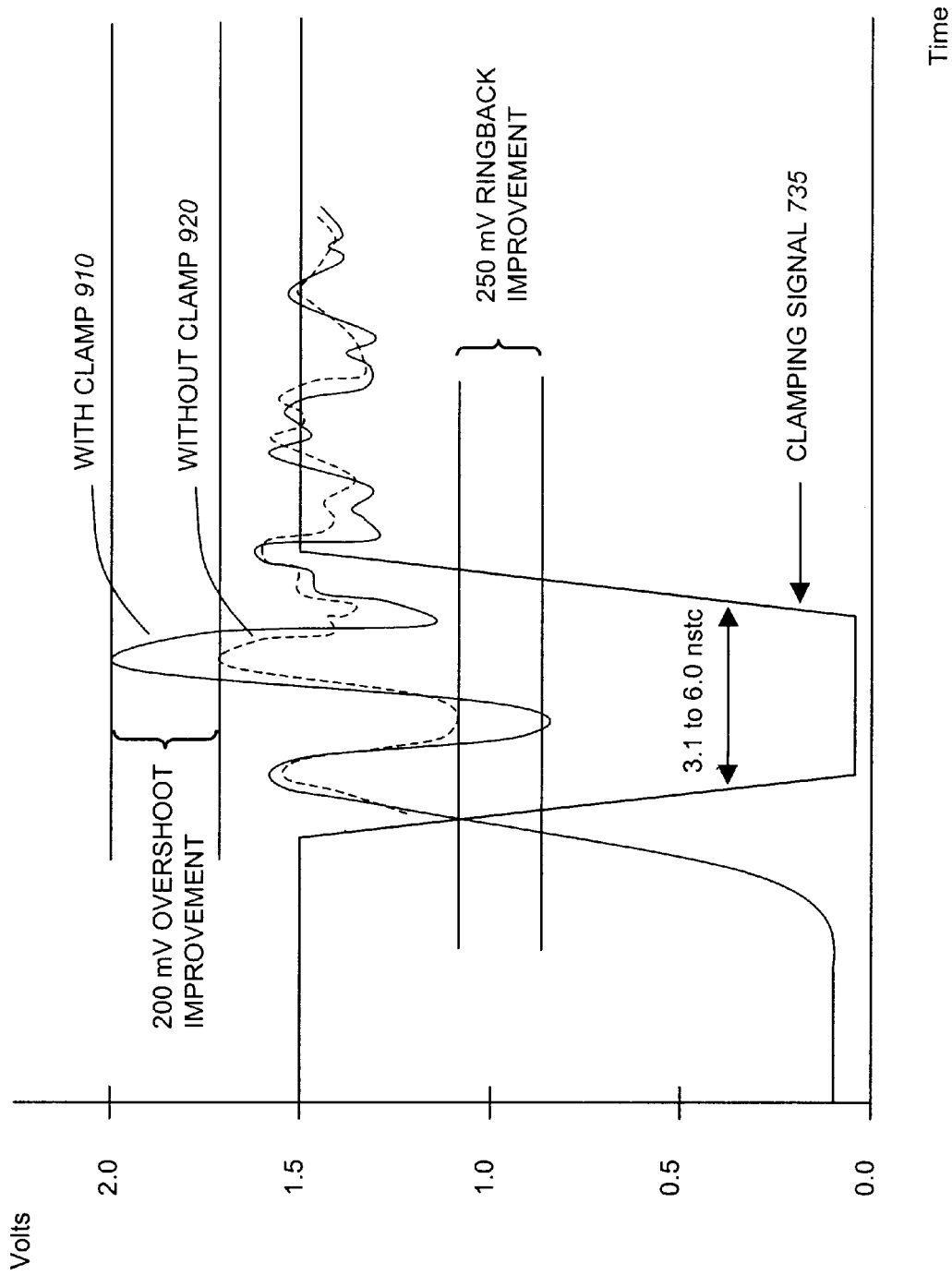
FIG. 9 is a timing diagram illustrating improvements in overshoot and ringback according to one embodiment of the invention.

FIG. 9 is a timing diagram illustrating improvements in overshoot and ringback according to one embodiment of the invention. The timing diagram includes an input signal without clamp 910, an input signal with clamp 920, and the clamping signal 735.

The vertical axis shows the voltage amplitude from 0.0V to approximately 2.0V. The horizontal axis shows the time in nanoseconds (nsec). As the input signal transitions from low to high, the clamping signal 735 is triggered to go low beginning the negative transition of the pulse interval. The pulse interval is approximately between 3.1 nsec to 6.0 nsec. With clamping, the ringback improvement s approximately 250 mV and the overshoot improvement is approximately 200 mV.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a pulse generator to generate a pulse signal having a pulse interval from an input signal and a delayed signal, the input signal transitioning from a first level to a second level, the delayed signal being derived from and synchronized with the input signal;
   a controller coupled to the pulse generator to generate a control signal responsive to the pulse signal; and
   a switching circuit coupled to the controller to clamp one of an overshoot and a ringback of the input signal within the pulse interval upon receipt of the control signal.

2. The apparatus of claim 1 further comprises:
   a sensing circuit to generate a sense signal from the input signal; and
   a synchronizer coupled to the sensing circuit to generate the delayed signal from the sense signal using a clock signal, the delayed signal being delayed from the input signal by approximately the pulse interval.

3. The apparatus of claim 2 wherein the sensing circuit comprises:
   a sensing amplifier to sense the input signal transitioning from the first to the second levels; and
   an inverter to invert the sensed input signal to generate the sense signal.

4. The apparatus of claim 3 wherein the synchronizer comprises:
   a frequency scaler to scale the clock signal;
   at least a synchronizing element to generate a synchronized signal from the sense signal at the pulse interval using the scaled clock signal; and
   an inverter coupled to the at least a synchronizing element to invert the synchronized signal, the inverted synchronized signal corresponding to the delayed signal.

5. The apparatus of claim 4 wherein the pulse generator comprises:
   a logic combiner to combine the input signal and the delayed signal, the combined input and delayed signals corresponding to the pulse signal.

6. The apparatus of claim 4 wherein the pulse generator comprises:
   a logic combiner to combine the input signal, the delayed signal, and a first tri-state control signal, the combined input, delayed, and first tri-state signals corresponding to the pulse signal.

7. The apparatus of claim 6 wherein the controller comprises:
   a combiner to combine the pulse signal and a second tri-state signal, the combined pulse and second tri-state signals corresponding to the control signal.

8. The apparatus of claim 6 wherein the controller comprises:
   a combiner to combine the pulse signal, a second tri-state signal, and a driver/receiver signal, the combined pulse, second tri-state, and driver/receiver signals corresponding to the control signal.

9. The apparatus of claim 7 wherein the switching circuit comprises:
   first and second switching elements to generate a clamp signal responsive to the control signal and a gating signal;
   a combiner to combine the second tri-state signal, the input signal, and the delayed signal to generate the gating signal; and
   a pull-up transistor coupled to a pad connected to receive the input signal to clamp the input signal upon receipt of the clamp signal.

10. The apparatus of claim 9 wherein the driver/receiver signal controls signal direction at the pad.

11. A method comprising:
    generating a pulse signal having a pulse interval from an input signal and a delayed signal, the input signal transitioning from a first level to a second level, the delayed signal being derived from and synchronized with the input signal;
    generating a control signal responsive to the pulse signal; and
    clamping one of an overshoot and a ringback of the input signal within the pulse interval upon receipt of the control signal.

12. The method of claim 11 further comprises:
    generating a sense signal from the input signal; and
    generating the delayed signal from the sense signal using a clock signal, the delayed signal being delayed from the input signal by approximately the pulse interval.

13. The method of claim 12 wherein generating the sensing signal comprises:
    sensing the input signal transitioning from the first to the second levels; and inverting the sensed input signal to generate the sense signal.

14. The method of claim 13 wherein generating the delayed signal comprises:
scaling the clock signal;
generating a synchronized signal from the sense signal at the pulse interval using the scaled clock signal; and
inverting the synchronized signal, the inverted synchronized signal corresponding to the delayed signal.

15. The method of claim 14 wherein generating the pulse signal comprises:
combining the input signal and the delayed signal, the combined input and delayed signals corresponding to the pulse signal.

16. The method of claim 14 wherein generating the pulse signal comprises:
combining the input signal, the delayed signal, and a first tri-state signal, the combined input, delayed, and first tri-state signals corresponding to the pulse signal.

17. The method of claim 16 wherein generating the control signal comprises:
combining the pulse signal and a second tri-state signal, the combined pulse and second tri-state signals corresponding to the control signal.

18. The method of claim 16 wherein generating the control signal comprises:
combining the pulse signal, a second tri-state signal, and a driver/receiver signal, the combined pulse, second tri-state, and driver/receiver signals corresponding to the control signal.

19. The method of claim 17 wherein clamping comprises:
generating a clamp signal responsive to the control signal and a gating signal;
combining the second tri-state signal, the input signal, and the delayed signal to generate the gating signal; and
clamping the input signal upon receipt of the clamp signal.

20. The method of claim 18 wherein the driver/receiver signal controls signal direction at a pad connected to receive the input signal.

21. A system comprising:
a bus;
a buffer circuit coupled to the bus to receive an input signal, the buffer circuit comprising:
a pulse generator to generate a pulse signal having a pulse interval from an input signal and a delayed signal, the input signal transitioning from a first level to a second level, the delayed signal being derived from and synchronized with the input signal;
a controller coupled to the pulse generator to generate a control signal responsive to the pulse signal; and
a switching circuit coupled to the controller to clamp one of an overshoot and a ringback of the input signal within the pulse interval upon receipt of the control signal.

22. The system of claim 21 wherein the buffer circuit further comprises:
a sensing circuit to generate a sense signal from the input signal; and a synchronizer coupled to the sensing circuit to generate the delayed signal from the sense signal using a clock signal, the delayed signal being delayed from the input signal by approximately the pulse interval.

23. The system of claim 22 wherein the sensing circuit comprises:
a sensing amplifier to sense the input signal transitioning from the first to the second levels; and
an inverter to invert the sensed input signal to generate the sense signal.

24. The system of claim 23 wherein the synchronizer comprises:
a frequency scaler to scale the clock signal;
at least a synchronizing element to generate a synchronized signal from the sense signal at the pulse interval using the scaled clock signal; and
an inverter coupled to the at least a synchronizing element to invert the synchronized signal, the inverted synchronized signal corresponding to the delayed signal.

25. The system of claim 24 wherein the pulse generator comprises:
a logic combiner to combine the input signal and the delayed signal, the combined input and delayed signals corresponding to the pulse signal.

26. The system of claim 24 wherein the pulse generator comprises:
a logic combiner to combine the input signal, the delayed signal, and a first tri-state control signal, the combined input, delayed, and first tri-state signals corresponding to the pulse signal.

27. The system of claim 26 wherein the controller comprises:
a combiner to combine the pulse signal and a second tri-state signal, the combined pulse and second tri-state signals corresponding to the control signal.

28. The system of claim 26 wherein the controller comprises:
a combiner to combine the pulse signal, a second tri-state signal, and a driver/receiver signal, the combined pulse, second tri-state, and driver/receiver signals corresponding to the control signal.

29. The system of claim 27 wherein the switching circuit comprises:
first and second switching elements to generate a clamp signal responsive to the control signal and a gating signal;
a combiner to combine the second tri-state signal, the input signal, and the delayed signal to generate the gating signal; and
a pull-up transistor coupled to a pad connected to receive the input signal to clamp the input signal upon receipt of the clamp signal.

30. The system of claim 28 wherein the driver/receiver signal controls signal direction at a pad connected to receive the input signal.

* * * * *

UNITED STATES PATENT AND TRADEMARK OFFICE
CERTIFICATE OF CORRECTION

PATENT NO.   : 6,694,444 B1
DATED        : February 17, 2004
INVENTOR(S)  : Mandal It is certified that error appears in the above-identified patent and that said Letters Patent is hereby corrected as shown below:

Column 3,
Line 11, after "two processors", delete "I 10", insert -- 110 --.

Signed and Sealed this

Fifteenth Day of June, 2004

JON W. DUDAS
*Acting Director of the United States Patent and Trademark Office*